United States Patent [19]

Lumsden et al.

[11] Patent Number: 4,561,683
[45] Date of Patent: Dec. 31, 1985

[54] PIPE CONNECTOR WITH INTERENGAGEABLE TUBULAR PIN AND TUBULAR BOX MEMBERS

[75] Inventors: Norman Lumsden; Brian K. Phillips, both of Aberdeen, Scotland

[73] Assignee: Hunting Oilfield Services (UK) Limited, Aberdeen, Scotland

[21] Appl. No.: 456,697

[22] Filed: Jan. 10, 1983

[30] Foreign Application Priority Data

Jan. 18, 1982 [GB] United Kingdom ............... 8201249

[51] Int. Cl.⁴ ............................................. F16L 25/00
[52] U.S. Cl. .................... 285/381; 285/382.2; 403/334; 403/375
[58] Field of Search ................. 285/382.1, 334, 332.4, 285/381, 24, 18, 382.2, DIG. 22, DIG. 23, 31, 330, 328; 403/333, 334, 375, 380

[56] References Cited

U.S. PATENT DOCUMENTS

| | | | |
|---|---|---|---|
| 2,307,275 | 1/1941 | Johnson | 285/DIG. 23 |
| 3,114,566 | 12/1963 | Coberly et al. | 285/334 |
| 3,186,739 | 6/1965 | Mahoff et al. | 285/382.4 |
| 3,359,013 | 12/1967 | Knox et al. | 285/334 |
| 4,298,221 | 12/1981 | McGugan | 285/332.4 |

FOREIGN PATENT DOCUMENTS

| | | | |
|---|---|---|---|
| 2033518 | 5/1980 | United Kingdom | 285/381 |
| 1573945 | 8/1980 | United Kingdom | |
| 2064041 | 6/1981 | United Kingdom | 285/334 |
| 2099529 | 12/1982 | United Kingdom | 285/334 |

Primary Examiner—Cornelius J. Husar
Assistant Examiner—Todd G. Williams
Attorney, Agent, or Firm—Watson, Cole, Grindle & Watson

[57] ABSTRACT

A pipe connector which comprises a tubular box member that is telescopically engageable with a tubular pin member, the members having corresponding frusto-conical inner and outer peripheral surfaces which overlie one another when the members are fully engaged together. To axially lock the members together, the frusto-conical surfaces are provided with pairs of interengageable annular projections and grooves. The projections and grooves have varying axial extents and spacings so that, as the members are telescoped together, in all intermediate positions of the members, there is sufficient contact between crests of the grooves and surfaces between the projections to prevent inadvertent premature engagement of a projection with a groove.

8 Claims, 9 Drawing Figures

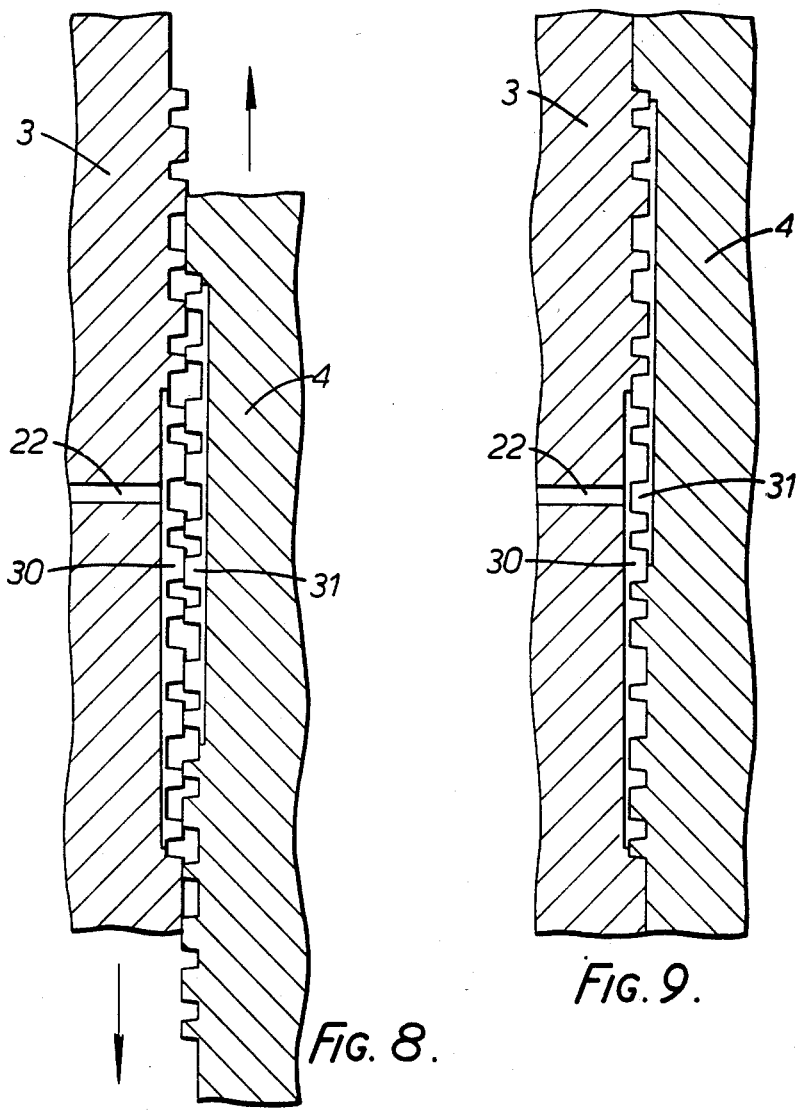

PIPE CONNECTOR WITH INTERENGAGEABLE TUBULAR PIN AND TUBULAR BOX MEMBERS

The present invention relates to improvements in pipe connectors, particularly (but not exclusively) for pipe connectors used in connecting pipe sections of a pipe string for use in drilling. More particularly, the invention relates to improvements in the type of pipe connector described in British Patent No. 1573945, and in U.K. Patent Application Publication Nos. 2033518 and 2099529.

In British Patent No. 1573945, there is described a pipe connector comprising a tubular pin member having a frusto-conical outer peripheral surface and a tubular box member having a frusto-conical inner peripheral surface, the frusto-conical peripheral surface of the tubular box member corresponding to the frusto-conical outer peripheral surface of the pin member. In use, the two members are telescoped together and are axially locked together by inter-engageable annular projections and grooves provided on the noted peripheral surfaces, the projections and grooves being spaced apart along the two surfaces.

In telescoping the two members together, the members are initially telescoped until surface contact is made between crest surfaces of the projections and surfaces between the grooves, at least at the ends of the overlapped portions of the surfaces. Hydraulic fluid under pressure may then be supplied between the overlapped parts of the surfaces to expand the box member and/or contract the pin member to permit the members to be fully telescoped together.

In order to reduce the axial extent of the members it is convenient to provide projections and grooves which have relatively small axial extents, but this may mean that, to fully telescope the members together after they have been brought into initial contact, it is necessary to move the individual projections past at least one groove before each projection is aligned with the groove in which it engages. If there is a slight reduction in the pressure of the hydraulic fluid either because of a malfunction of the supply or because there is a sudden undue escape of hydraulic fluid from between the overlapped portions of the members, there is a risk that the projections and grooves may inter-engage before the members are fully telescoped together making it impossible to disengage the projections and grooves.

SUMMARY OF THE INVENTION

According to the present invention there is provided a pipe connector comprising a tubular pin member having a frusto-conical outer peripheral surface and a tubular box member for receiving and engaging with the pin member and having a frusto-conical inner peripheral surface, the frusto-conical inner peripheral surface of the pin member overlying the frusto-conical surface of the pin member when the members are fully engaged together, wherein, to axially lock the members together, the frusto-conical surfaces of the members are provided with axially spaced apart, inter-engageable annular projections and grooves, corresponding pairs of which are inter-engaged when the members are fully engaged together, the pairs of projections and grooves having differing axial extents and being arranged so that, as the members are brought into full engagement, in all intermediate positions of the members, after the frusto-conical surfaces have been brought into initial surface contact, there is contact between the crests of at least some of the projections and surfaces between the grooves which are spaced apart along the length of the overlying parts of the surfaces, to prevent premature inter-engagement of projections and grooves before the members are fully engaged together.

All the pairs of projections and grooves may have different axial extents or some may have the same axial extents as others. For example, the pairs of projections and grooves intermediate the end projections and grooves may have one of two different axial extents and they may be arranged in a regular or irregular fashion along the length of the surfaces.

As in the above referred to British patent and published U.K. patent applications, the projections and grooves advantageously have a constant radial height and depth, respectively, along the length of the surface, so that the crest surfaces of the projections, surfaces between the projections, root surfaces of the grooves and surfaces between the grooves all lie on frusto-conical surfaces having the same conicity. Advantageously, the crest surfaces of the projections and root surfaces of the grooves are linear in an axial direction.

The radially-extending end surfaces of the projections and grooves may extend in radial planes or be inclined thereto and may have different inclinations at the opposed ends of the projections and grooves, as in the above referred to patent and published patent applications.

Additionally, if the pipe connector is to be used under circumstances where it must be capable of transmitting axial forces, the members may be arranged so that when they are fully inter-engaged, a part at least of the free end surface of one of the members is in abutment with a corresponding surface on the other member and is held in abutment by inter-engagement of the projections and grooves, i.e., so that on full engagement of the members there is a force fit between the surfaces of the members and the projections and grooves.

For assisting the engagement of the members and for enabling disengagement of the members, pressurized fluid, for example hydraulic fluid, may be supplied between the overlapped portions of the members. For this purpose, the box member may be provided with a radial duct connectable to a supply of hydraulic fluid and opening into the frusto-conical surface intermediate the ends. To ensure flow of fluid to all parts of the overlapped surfaces during engagement of the members and after initial engagement thereof, and for enabling disengagement of the members, the box member may be provided with an axially-extending groove communicating with the duct and extending to that end of the region provided with the projections and grooves adjacent the free end of the box. The pin may similarly be provided with a groove extending to that end of the region provided with the grooves and projections adjacent the free end of the pin. The grooves extend to intermediate points along the surfaces of the pin and box members, such that when the members are fully engaged, the grooves overlap axially, and when the members are brought into contact initially, the grooves do not extend beyond the initially overlapped portions.

The present invention will be more fully understood from the following description of an embodiment thereof, given by way of example only, with reference to the accompanying drawings:

DESCRIPTION OF THE DRAWINGS

FIGS. 8 and 9 are part axial sections of the members of an embodiment of a pipe connector according to the present invention, when the members are brought into initial contact and when the members are fully engaged, respectively, and showing means for supplying pressurized fluid to the overlapped surface portions of the members.

DETAILED DESCRIPTION OF THE PREFERRED EMBODIMENTS

FIGS. 1 to 6 show the frusto-conical inner and outer peripheral surfaces 1, 2 of tubular pin and box members (or box and pin members) 3, 4 of a pipe connector connected, or for connection, to the ends of two pipes, and of the type described in British Patent No. 1573945 and U.K. Patent Application Publication Nos. 2033518 and 2099529, in which the members 3, 4 are telescoped together.

Figure 1:
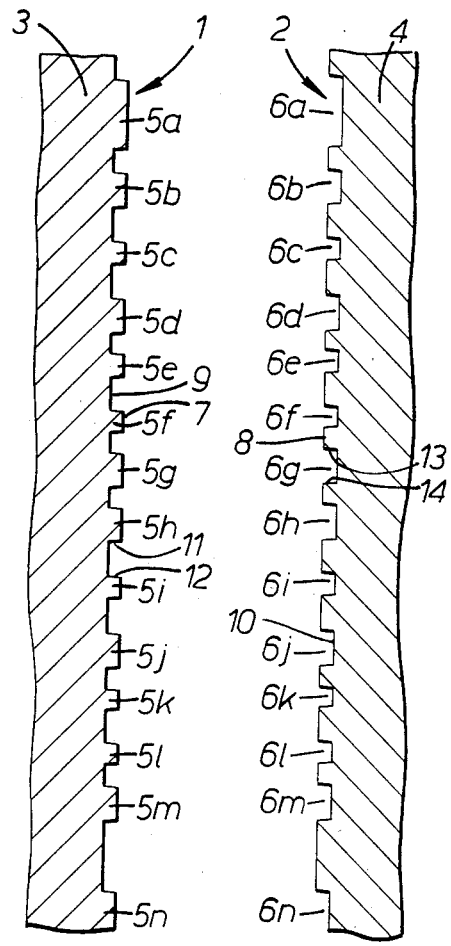
FIG. 1 is a part axial section showing the shaping of the frusto-conical surfaces of the members of an embodiment of a pipe connector according to the present invention.
Figure 2:
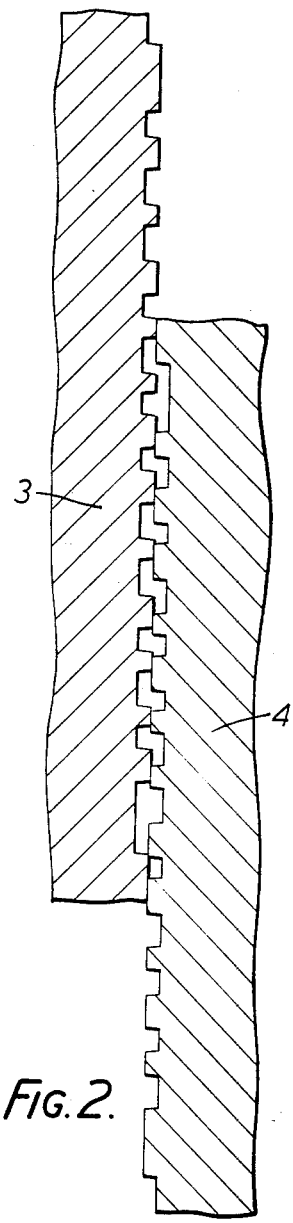
FIGS. 2 to 5 are part axial sections similar to those of FIG. 1 showing the members as they are progressively telescoped together.
Figure 3:
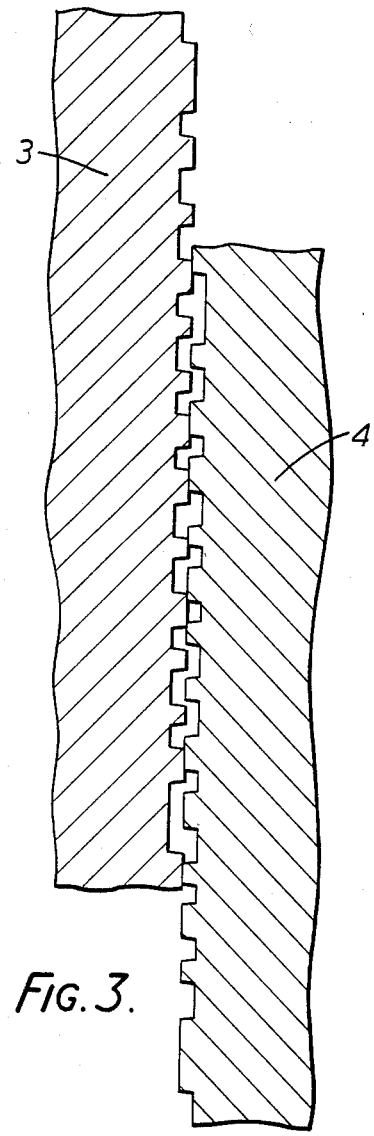
Figure 4:
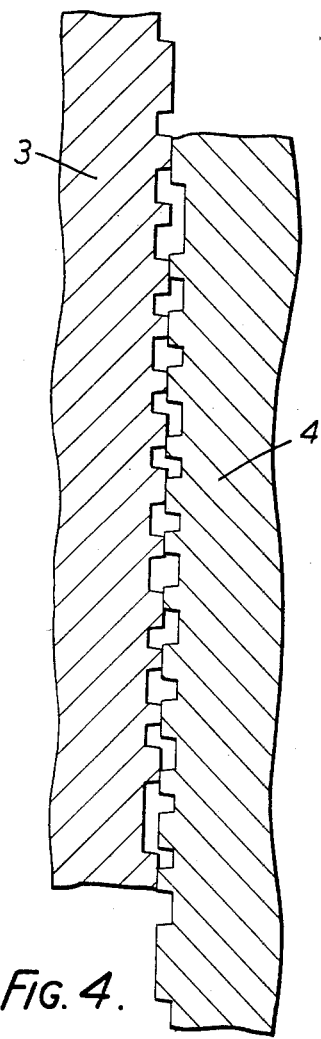
Figure 5:
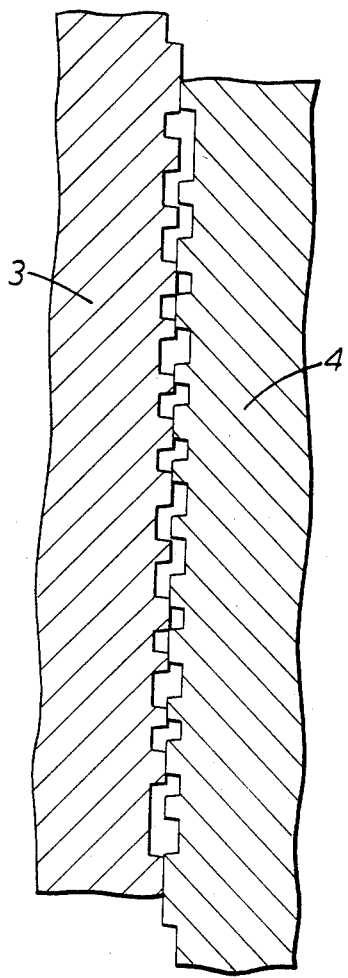
Figure 6:
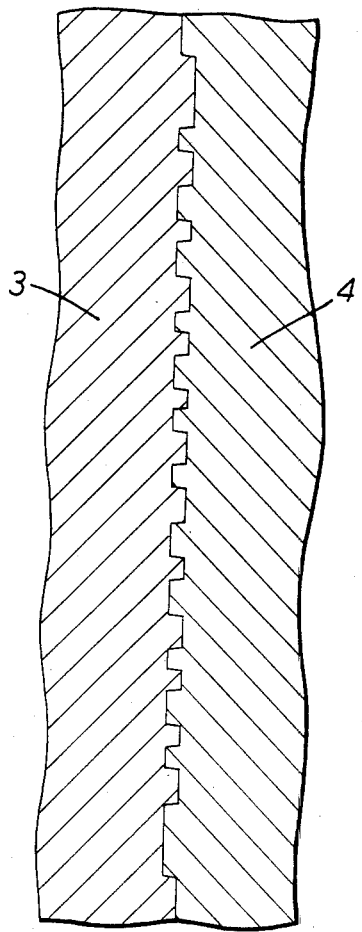
FIG. 6 is a part axial section similar to that of FIG. 1 showing the members when they are fully telescoped together.

The surfaces 1, 2 are provided with annular projections 5 and grooves 6 which are axially spaced apart along the length thereof and are relatively dimensioned so that, when the members are fully engaged, corresponding ones of the projections 5 inter-engage in the grooves 6, as shown in FIG. 6, to axially lock the members together.

Engagement of the members takes place in two stages. Initially the members are brought together until contact is established between crests of the projections and surfaces between the grooves. Thereafter, force is applied axially to complete engagement of the members. At the end of the first stage a projection 5 may yet have to pass over a plurality, for example three or four, grooves 6 before it reaches its corresponding groove. To prevent inadvertent and premature engagement of a projection 5 with a groove 6 which is not its corresponding groove, i.e., before the members are fully telescoped together, the corresponding pairs of projections and grooves are provided with differing axial extents and spacings along the lengths of the surfaces 1, 2. The projections and grooves are arranged, as shown for example in FIGS. 2 to 5, so that at intermediate positions during telescoping of the members 3, 4, at least after the members have been brought into initial contact, at least some of the crest surfaces 7 of projections spaced along the length of the surface 1 and intermediate the ends of the overlapped portions of the surfaces 1, 2, are in contact with surfaces 8 between the grooves to prevent any inter-engagement of the projections and grooves along any substantial length of the overlapped portions of the surfaces.

In the specific embodiment, the end surface portions of the frusto-conical surfaces have relatively substantial axial extents for sealing purposes if pressurized fluid is used, as will be described. Intermediate these surfaces, the corresponding pairs of projections and grooves have one of two axial extents and are arranged randomly to produce the desired effect. As shown, projections 5b, 5d, 5g, 5h, 5j and 5m and the corresponding grooves all have the same axial extent, which is different from that of projections 5c, 5e, 5f, 5i, 5k and 5l, which all have the same smaller axial extent. Additionally, the spacing between projections 5b and 5c, 5c and 5d, 5e and 5f, 5h and 5i, 5i and 5j and 5k and 5l is the same but larger than the spacing between projections 5a and 5b, 5d and 5e, 5f and 5g, 5g and 5h, 5j and 5k and 5l and 5m, which is the same. The spacing of the grooves 6 corresponds.

It will be appreciated that the effect of providing axially spaced annular projections and grooves along the length of the surfaces in an arrangement such as to prevent premature inter-engagement of the projections and grooves can be obtained in any number of different ways by appropriate selection of different axial extents and spacings for the spaced projections and grooves.

Apart from the above-described relative axial dimensioning of the projections and grooves, the pipe connector may have any of the other features of the pipe connectors described in the above referred to British patent and published U.K. patent applications.

Specifically, the radial extents of the projections and grooves may be constant over the length of the surfaces, so that the crest surfaces 7 of the projections, the surfaces 9 between the projections, the root surfaces 10 of the grooves and the surfaces 8 between the grooves, all lie on frusto-conical surfaces having the same conicity, which may for example be 1.5° or 2°. The generatrices of the surfaces 7, 8, 9 and 10 may be linear, as shown, in an axial direction. While as shown the radially-extending surfaces 11, 12 and 13, 14 at each end of each projection and groove extend in generally radial planes, these surfaces may be inclined to the radial planes.

For example, the surfaces at one end of each projection and the corresponding end of the groove may have an inclination to the radial plane of the order of 12° and at the other end of each projection and groove the surfaces may be inclined at an angle of the order of 60° to the radial plane.

Figure 7:
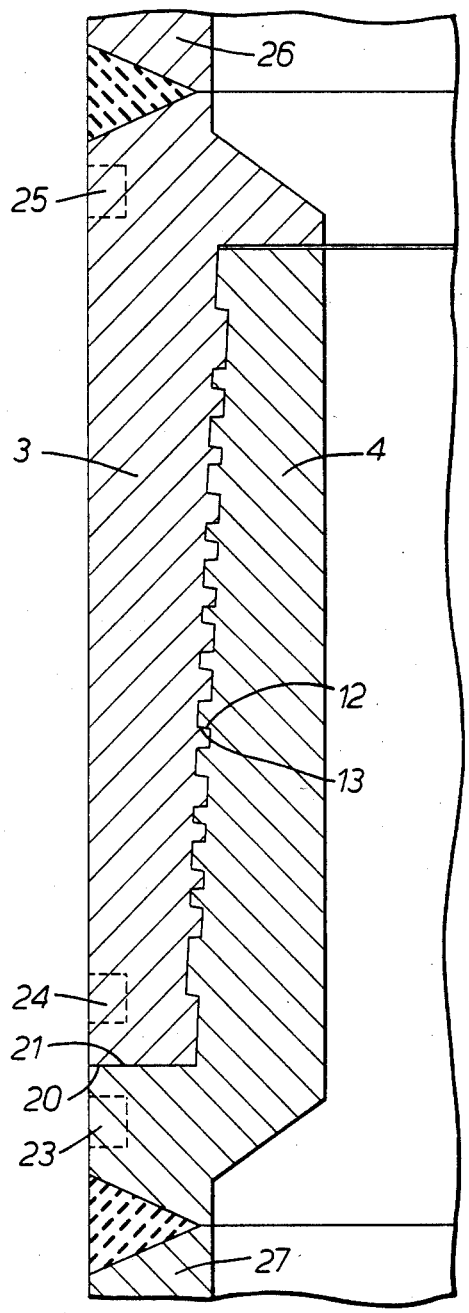
FIG. 7 is a part axial section showing a pipe connector with the frusto-conical surface shaping of FIGS. 1 to 6.

As shown in FIG. 7, where the pipe connector is to be used to connect pipes which must be capable of transmitting axial forces, for example for pile driving, an end surface of one of the members may be brought into abutment with a corresponding surface on the other member. For example, as shown in FIG. 7, the box member 3 is provided with a radial surface 20 at its free end which is brought into abutment with a radial surface 21 provided on the pin member 4. To maintain the surfaces in abutment for pile driving purposes, the projections and grooves may be arranged so that there is a force fit between surfaces 20, 21 and radially-extending surfaces 12, 13 on the projections and grooves, these radially-extending surfaces having an inclination relatively close to the radial plane, for example, as previously mentioned at 12°. Additionally, the projections and grooves may be arranged so that, when the members 3, 4 are fully engaged, there is a radial clearance between surfaces 7 and 10 and between surfaces 8 and 9 and there may be an axial clearance between surfaces 11 and 14.

The members may be fully engaged by the application of pressurized hydraulic fluid to the overlapped portions of the surfaces following initial contact and may be disengaged in the same way, the pressurized fluid both expanding the box and/or contracting the pin to permit engagement and lubricating the crest surfaces 7 of the projections and surfaces 8 between the grooves to facilitate sliding of these surfaces over one another. For this purpose, as shown in FIGS. 8 and 9, the box member 3 may be provided with a radial duct 22 for connection to a source of pressurized hydraulic fluid. The duct 22 opens inwardly of the box into the region of the frusto-conical surface of the box which is provided with the projections or grooves. To ensure that the hydraulic fluid is able to flow along the full extent of the overlapped portions of the surfaces of the members, axially extending grooves 30, 31 are provided in both the box member and the pin member, duct 22 opening into groove 30 in the box member.

The pressurized fluid is only required to assist engagement of the members after initial contact has been made. To prevent loss of hydraulic fluid at the ends of the overlapped surfaces before full engagement of the members, the axial extents of the grooves must be limited. Specifically, each groove extends from the last groove or recess between projections adjacent the free end of the pin and box respectively to an intermediate position along the corresponding surface which lies within the overlapped portions of the surfaces on initial contact but is such that the two grooves 30, 31 overlap, as shown in FIG. 8. However, for disengagement of the members using hydraulic fluid, the grooves 30, 31 must overlap when the members are fully engaged to ensure that fluid is communicated the full length of the parts of the surfaces provided with projections and grooves, as shown in FIG. 9.

During application of the pressurized fluid, the members 3, 4 are pulled together or may be pulled apart by a clamping arrangement, as for example, shown in FIG. 6 of British Patent Specification No. 1573945, which engages in circumferential grooves 23 and 24 or grooves 23 and 25, shown in broken lines in FIG. 7, or by a clamping device, e.g. comprising slips, which engages the pipes above and below the members. Alternatively, if the pipes to be connected are orientated vertically, the engagement force may simply be provided by the weight of the upper pipe to be connected to the lower pipe which is relatively fixed.

As shown in FIG. 7, the members 3, 4 may in use be welded to the ends of two pipes 26, 27, or they may be made integral therewith or otherwise connected to the pipes.

To ensure that the pipe connector is disengageable, it may be provided with the features of U.K. Patent Application Publication No. 2099529 or in U.K. Patent Application Publication No. 2118334.

What is claimed is:

1. In a pipe connector comprising a tubular pin member having a frusto-conical outer peripheral surface and a tubular box member for receiving and engageable with said pin member, said tubular box member having a frusto-conical inner peripheral surface which overlies said frusto-conical surface of said pin member when said members are fully engaged together, wherein, to axially lock said members together, said frusto-conical surfaces of the members are provided with axially spaced apart, inter-engageable annular projections and grooves, corresponding pairs of which are interengaged when said members are fully engaged together, the improvement wherein said pairs of projections and grooves have differing axial extents and are arranged so that, as said members are brought into full engagement, in all intermediate positions of said members, after said frusto-conical surfaces have been brought into initial surface contact, there is contact between crests of at least some of said projections and surfaces between said grooves which are spaced apart along the length of the overlying parts of said surfaces so as to prevent premature inter-engagement of projections and grooves before said members are fully engaged together.

2. In a pipe connector as claimed in claim 1, wherein all said pairs of projections and grooves have differing extents.

3. In a pipe connector as claimed in claim 1, wherein some of said pairs of projections and grooves have a first axial extent and others of said pairs of projections and grooves have a second axial extent smaller than said first axial extent.

4. In a pipe connector as claimed in claim 1, wherein the spacing between adjacent pairs of projections and grooves varies along the length of said members.

5. In a pipe connector as claimed in claim 3, wherein the spacing between some adjacent pairs of grooves and projections has a first axial extent and the spacing between other adjacent pairs of grooves and projections has a second axial extent smaller than said first axial extent.

6. In a pipe connector as claimed in claim 1, wherein said projections and grooves have a constant radial depth along the length of the surfaces, such that said crest surfaces of said projections, the surfaces between said projections, the root surfaces of said grooves, and said surfaces between said grooves, all lie on frusto-conical surfaces having substantially the same angles of conicity.

7. In a pipe connector as claimed in claim 1, including a radial duct in said box member for inlet of fluid under pressure, an axially-extending groove in said frusto-conical surface of said box member into which said duct opens, said axially-extending groove extending from said duct towards the free end of said box member, and an axially-extending groove in said frusto-conical surface thereof of said pin member extending towards said free end of said pin member, said axially-extending grooves in said surfaces of the box and pin members extending to points intermediate the ends of said surfaces which are such that, when said members are fully engaged together, said axially-extending grooves overlap, and when said members are brought into initial surface contact, said axially-extending grooves extend no further than the initially overlying portions of the surfaces thereof provided with said annular projections and grooves.

8. In a pipe connector as claimed in claim 5, including a radial duct in said box member for inlet of fluid under pressure, an axially-extending groove in said frusto-conical surface of said box member into which said duct opens, said axially-extending groove extending from said duct towards the free end of said box member, and an axially-extending groove in said frusto-conical surface thereof of said pin member extending towards said free end of said pin member, said axially-extending grooves in said surfaces of the box and pin members extending to points intermediate the ends of said surfaces which are such that, when said members are fully engaged together, said axially-extending grooves overlap, and when said members are brought into initial surface contact, said axially-extending grooves extend no further than the initially overlying portions of the surfaces thereof provided with said annular projections and grooves.

* * * * *